Patented Mar. 28, 1944

2,345,333

UNITED STATES PATENT OFFICE 2,345,333

PROCESS FOR THE MANUFACTURE OF SO-
LUTIONS OF CELLULOSE IN SULPHURIC
ACID

Heinrich Fink and Richard Hofstadt, Rottweil-
on-the-Neckar, Germany; vested in the Alien
Property Custodian No Drawing. Application July 10, 1940, Serial
No. 344,782. In Germany July 22, 1939

1 Claim. (Cl. 260—215)

This invention relates to the manufacture of solutions of cellulose in sulphuric acid.

It is known to dissolve cellulose in mineral acids, such as sulphuric acid, phosphoric acid, hydrochloric acid and other acids or mixtures thereof, and to work up these solutions into fibers, films or similar structures of this kind. In this case the cellulose is first thoroughly swollen with a weaker acid near the dissolving concentration and finally completely dissolved with an acid of higher concentration.

Furthermore it is known that cellulose in these strongly acid solutions is easily decomposed, and that the production and working up of these solutions involves considerable difficulties.

It is an object of the present invention to provide a method of dissolving cellulose in sulphuric acid, which is free from these disadvantages.

This and other objects will become apparent from the following specification.

The present invention relates to the manufacture of solutions of cellulose in strong sulphuric acid, whereby the cellulose is first impregnated or wetted with a weaker acid (wetting acid) and then dissolved in a strong acid (dissolving acid). The process comprises impregnating the cellulose with only 2½–3 times its weight of wetting acid and adding so much of dissolving acid of a concentration above 90%, that the total amount of sulphuric acid used for complete solution (calculated as monohydrate) amounts to not more than 5 times, preferably 4 times and less, the weight of cellulose.

It has always been endeavoured in the art to dissolve in the strong acids as much cellulose as possible, but in spite of this concentrations higher than 1 kg. cellulose in 8 liters strong acid were never reached, as the concentrations of the acids applied and the working methods did not admit the dissolution of larger quantities of cellulose.

When wetting the cellulose with a barely sufficient amount of acid, it is difficult to impregnate evenly the entire cellulose. When working too slowly and when using a swelling acid, the latter being near the dissolving concentration, part of the cellulose takes up the total amount of sulphuric acid, whereas the other part remains dry. Also when mixing and kneading continuously such an uneven cellulose-sulphuric-acid-mixture, an even distribution of the sulphuric acid in the cellulose mass can never be obtained. On the other hand it is impractical to use the wetting acid in too weak a concentration, since solutions of high cellulose content are required, for which then correspondingly higher amounts of dissolving acid are necessary. Concentrations between 55–59% $H_2SO_4$ are most suitable for that purpose.

Though it is possible, when working quickly and with not too large quantities, to evenly impregnate the cellulose being suitably distributed with 2.5–3 times its quantity of 55–59% acid, if said acid is added to the mass all at once while stirring violently, it is generally to be preferred to employ a larger surplus of wetting acid and to squeeze it off again as quickly as possible. When squeezing off the acid, care has to be taken, that the cellulose, though completely impregnated, has not yet reached the maximum degree of swelling. This may be brought about by adapting the concentration of the wetting acid to the swelling capacity of the employed cellulose material. The right concentration is easily determined in every case by some sample tests. The right degree of pressing the cellulose can be, for instance, brought about by impregnating the cellulose with wetting acid of the right concentration on a continuous belt conveyer and immediately squeezing off the acid between press rolls.

While hitherto ten times the weight of wetting acid has been used for the impregnation of the cellulose, it may be attained, when working properly and adjusting properly the concentration to the kind of cellulose material, that the weight of the cellulose pulp amounts to only three times, sometimes 2.5 times that of the cellulose.

In order to cause dissolution of the cellulose, it is necessary to employ an extremely high concentration, which hitherto was unusual, for instance 90–96% $H_2SO_4$, of the dissolving acid. Also sulphuric acid monohydrate may be employed, while cooling, without causing a harmful decomposition of the cellulose. The amount of the dissolving acid required depends on the concentration. Solutions containing 4–5 parts $H_2SO_4$ (monohydrate) for one part cellulose are relatively easily obtained, provided the concentration of the acids is properly chosen and the mass properly cooled. The high cellulose contents of the solutions are quite useful for the manufacture of filaments and films, when working up the solutions, because large quantities of sulphuric acid and precipitating agents can be saved in this way. Another advantage of these solutions resides in the fact that they are relatively stable.

It is evident that the cellulose solutions according to the present invention are so extremely viscous, that the viscosity cannot be determined any more according to known methods. The spinning of the solutions, however, with known devices, for instance by using spinning nozzles of an inner width of 0.09 mm., is easily feasible. An increased pressure, however, has to be applied to extrude the solutions through the nozzles. 50–60 atmospheres are completely sufficient in most cases.

*Example I*

475 grams cellulose (air dry) are brought together at 0° in a mixing vessel with 1500 grams sulphuric acid of 59% $H_2SO_4$ and are then homogenized in a suitable device adapted for kneading, while cooling continuously. There are added to the cellulose pulp 1060 grams sulphuric acid of 96% $H_2SO_4$, which are also very well pre-cooled. After a short time there is obtained a clear solution which can be spun or worked up in a manner known per se into filaments, films and the like; it contains

| | Per cent |
|---|---|
| Cellulose | 14.7 |
| $H_2SO_4$ | 62.7 |
| Water | 22.6 |

*Example II*

Cellulose (air dry) is impregnated at 0° in the form of plates or directly from the continuous belt conveyer in sulphuric acid of 59% $H_2SO_4$ in such a way, that always 400 grams cellulose are brought together with 3000 grams sulphuric acid of 59% and squeezed down to 1000 grams in the usual way by means of cell filters or press rolls. The cellulose thus treated is brought together, while continuously cooling, after it has been loosened up in a mixing vessel adapted for kneading or otherwise suitable with 1080 grams sulphuric acid of 91% $H_2SO_4$, whereby the sulphuric acid must be pre-cooled very well  After a short time a solution is obtained, which may be worked up according to Example I.

*Example III*

550 grams cellulose (air dry) are impregnated at 0° with 3000 grams sulphuric acid of 59% and shortly afterwards squeezed down to 1550 grams. This mass is homogenized, while cooling, in a crusher or kneading device and 250 grams oleum of 25% $SO_3$ are added thereto. A pasty clear solution, in which the sulphuric acid amounts to less than double the amount of cellulose, is obtained.

What we claim is:

The process of producing viscous solutions of cellulose in sulphuric acid in which the amount by weight of sulphuric acid calculated as the monohydrate is less than five times the amount of cellulose; which comprises adding sulphuric acid having a strength of 55–59% to air dry cellulose while cooling said mixture, removing any sulphuric acid in excess of three times the amount of said cellulose therefrom after said cellulose is impregnated with such acid, but before it is completely swelled, and thereafter adding to such impregnated cellulose, while cooling, a sufficient amount of sulphuric acid of such a strength, greater than 90%, as to completely dissolve said cellulose, the amount of such last mentioned acid which is added to said cellulose being such that the ratio of acid to cellulose in the thus formed solution is less than 5 parts by weight of acid calculated as the monohydrate to 1 part of cellulose.

HEINRICH FINK.
RICHARD HOFSTADT.